Figure 1:
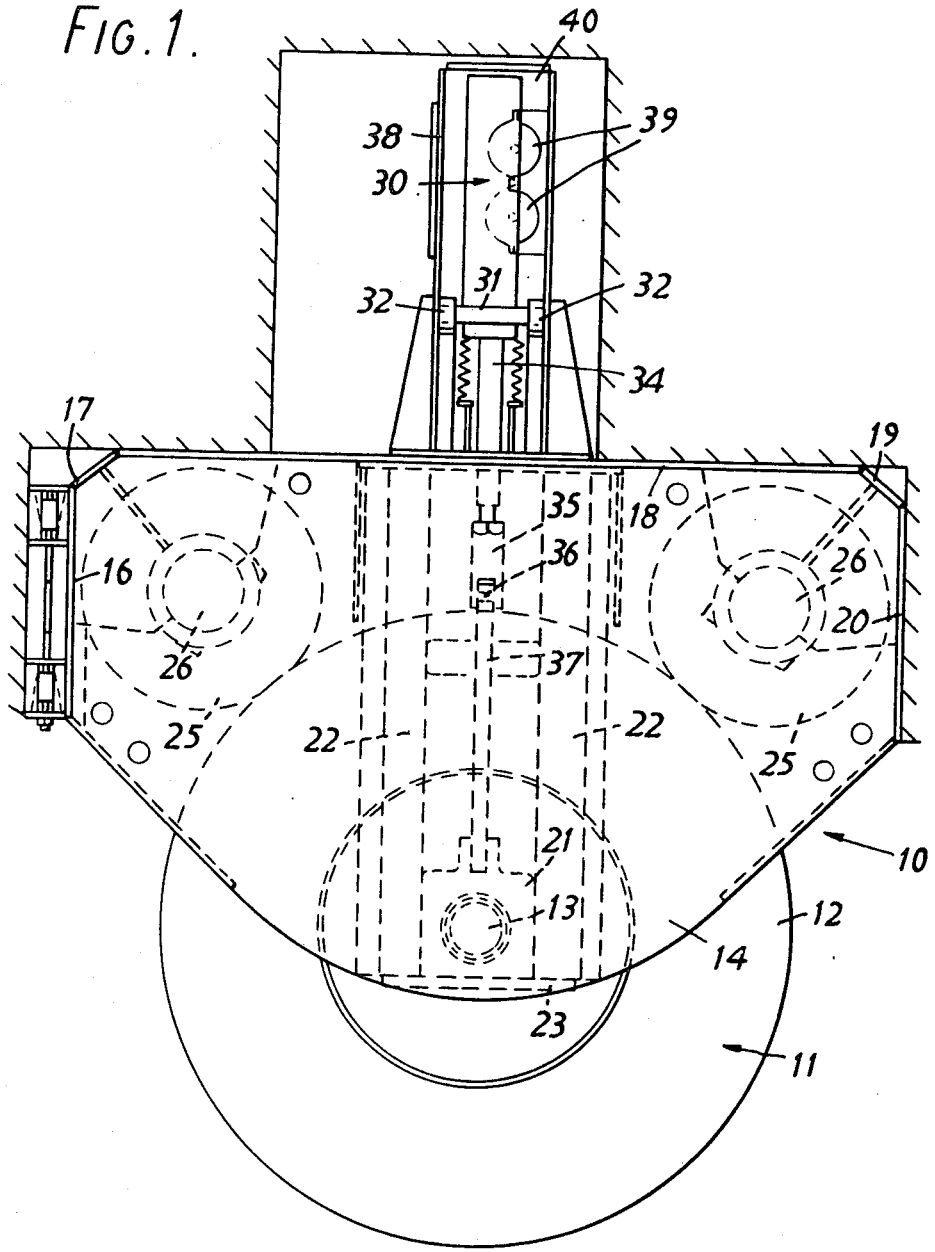

United States Patent

Ackroyd et al.

[11] 3,890,917
[45] June 24, 1975

[54] MARINE FENDERS

[75] Inventors: John Morton Ackroyd, Windsor; Graham Arthur Nigel Hart, Aylesbury, both of England

[73] Assignee: Firestone Burleigh Marine Pneumatic Fendering Company Limited, Middlesex, England

[22] Filed: Dec. 20, 1973

[21] Appl. No.: 426,697

Related U.S. Application Data

[63] Continuation-in-part of Ser. No. 218,892, Jan., 1972, abandoned.

[30] Foreign Application Priority Data

Jan. 19, 1971 United Kingdom.................. 2685/71

[52] U.S. Cl..................................... 114/220; 61/48
[51] Int. Cl............................................ B63b 21/04
[58] Field of Search ................ 114/219, 220; 61/48; 267/116, 139; 293/9

[56] References Cited
UNITED STATES PATENTS 2,039,151  4/1936  Dubois................................... 61/48
3,106,182  10/1963  Burleigh............................. 114/220

Primary Examiner—Trygve M. Blix
Assistant Examiner—Jesus D. Sotelo
Attorney, Agent, or Firm—Wenderoth, Lind & Ponack

[57] ABSTRACT

A marine fender for use on dock walls and at lock entrances comprises a wheel equipped with a pneumatic tire and mounted on a vertical axle in a supporting structure. Two rollers are mounted on vertical axles in the supporting structure, and the wheel axle can slide at right angles to its own length to allow the tire to be pressed into resilient deforming engagement with the rollers. This inward movement, and the return movement, of the wheel are yieldingly resisted by hydraulic rams attached to the wheel axle, and the flow of the hydraulic fluid of the rams during the instroke of the rams is controlled by a control device incorporating a restrictor the effective restriction of which is reduced as the instroke proceeds. This causes a rapid increase in the fending force exerted by the wheel during its initial inward movement, and a subsequent levelling off of this force as it approaches its maximum permissible value during the remaining part of the inward movement.

10 Claims, 6 Drawing Figures

MARINE FENDERS

This application is a continuation-in-part of copending application Ser. No. 218,892, filed Jan. 19, 1972, now abandoned.

The present invention relates to fenders and in particular to fenders of the type which are provided for the protection of fixed structures, such as quays or piers, against impact by ships and which may similarly be provided on ships to protect quays and piers.

It has already been proposed to employ rotatable wheels having large diameter pneumatic tire as fenders for this purpose. The deflection of the pneumatic tire absorbs some of the energy of the impact, but problems have arisen by reason of the fact that if the resistance of the fender under impact rises above a certain point damage to the ship may nevertheless occur by reason of the resilient rebound reaction of the pneumatic tire.

According to this invention there is provided a fender unit comprising a supporting structure, a wheel mounting, a wheel having a pneumatic tire and means mounting said wheel for rotation about a vertical axis in said wheel mounting, said supporting structure having guide means for guiding the movement of said wheel mounting for guided movement in a rectilinear path perpendicular to said axis inwardly from and outwardly towards an outer limiting position, at least one roller and means mounting said roller in the supporting structure for rotation about a fixed vertical axis, said roller being in engagement with the pneumatic tire of the wheel resiliently to resist inward movement of the wheel along said path, and hydraulic control means operative to apply a high resistance to initial inward movement of the wheel along said path and to reduce said resistance as inward displacement of the wheel from its outer limiting position increases.

Figure 2:
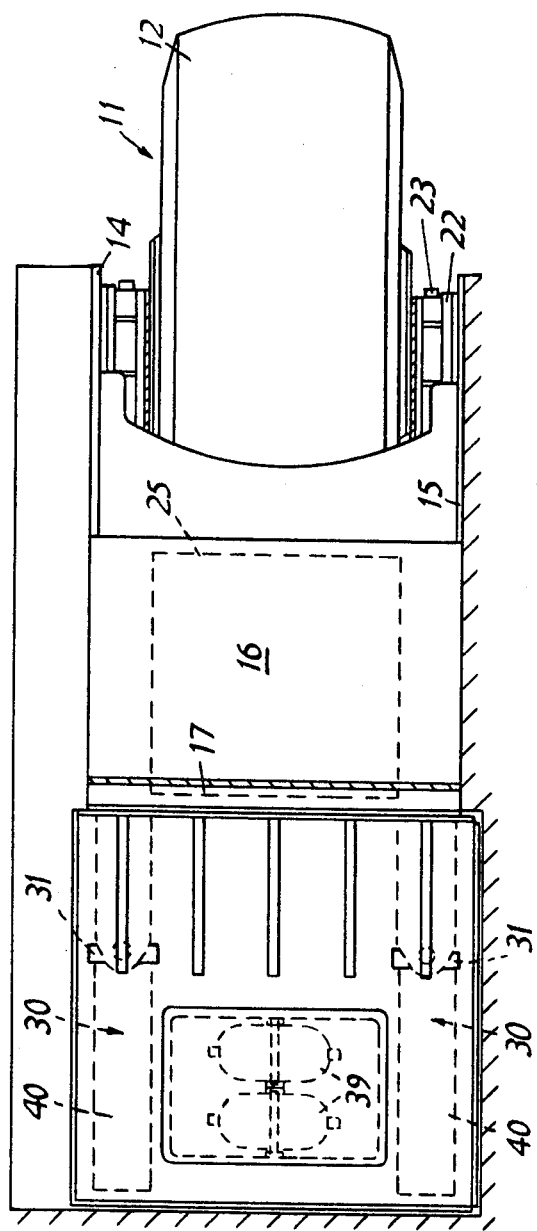
Figure 3:
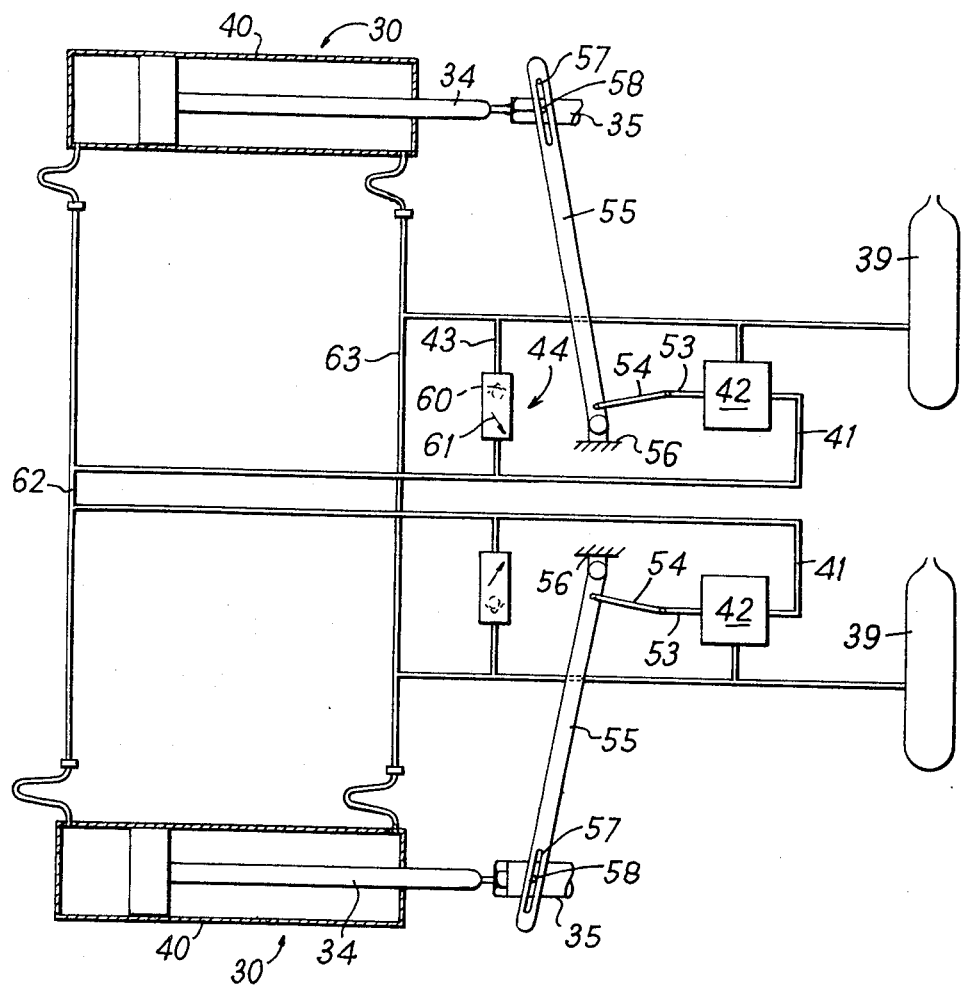
Figure 4:
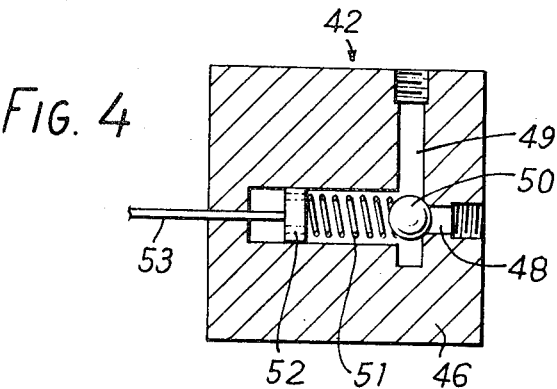
Figure 5:
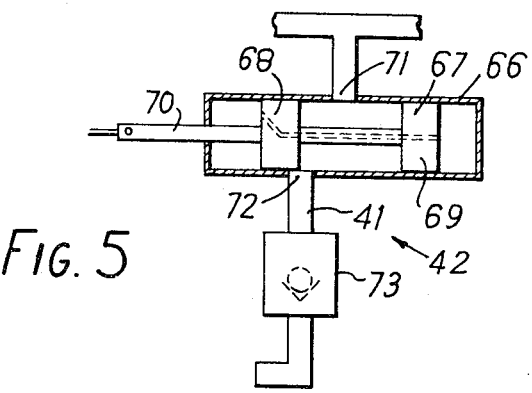
Figure 6:
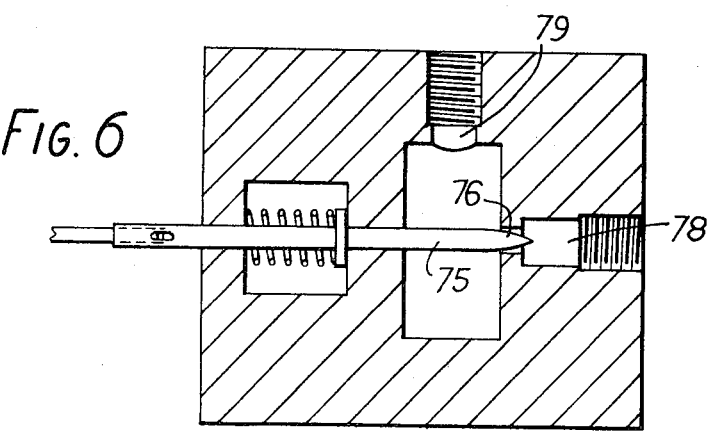

The invention will now be described in more detail with reference by way of example to the accompanying drawings in which:

FIG. 1 is a plan of a fender unit according to the invention installed in a wall, FIG. 2 is a side elevation of the unit, FIG. 3 is a diagrammatic drawing of the hydraulic circuit of the fender unit, FIG. 4 shows a fluid flow control means of the hydraulic circuit, and FIGS. 5 and 6 shows two alternative forms of fluid control means.

Referring to the drawings the fender unit 10 is shown disposed in a recess at the top of the wall and comprises a rotatable wheel 11 equipped with a pneumatic tire 12 and arranged with its axis vertical, the wheel being mounted for lateral inward movement against the restraint of a resilient force when hit by a ship. In the illustrated construction the wheel is mounted on a vertical axle 13 supported in a fixed casing structure. The casing structure comprises parallel top and bottom plates 14, 15 joined together by vertical plates 16 to 20 and is open at the front or outer side to allow the wheel to project beyond the face of the wall. The ends of the axle 13 are carried in respective bearing blocks 21, and these blocks are slidable inwards at right angles to the axis of the axle in guideways formed by guide strips 22 secured to the faces of the plates. Keep plates 23 secured to the ends of the guide strips 22 prevent the bearing blocks from moving outwards beyond the ends of the guideways.

Also mounted in the casing structure are two rollers 25 which engage the tire at points symmetrically disposed with respect to the guideways and which are rotatably carried on axles 26 which are fixedly supported by the plates 14, 15.

When the wheel is hit by a ship the tire 12 is deflected by the ship and the wheel is pushed inwards along the guideway causing the rollers 25 also to deflect the tire in resisting the inward movement of the wheel. These deflections of the tire absorb energy from the impact and increase to a point at which further inward movement of the wheel is arrested. If the energy absorbed in compressing the air in the pneumatic tire is simply released in an uncontrolled manner as the ship rebounds from the fender, the rebound of the ship may be excessive where the fender is used on entrances to locks. Also, where a ship is moored against a quay protected by such fenders it is possible under certain wind and other conditions for a resonant movement to be set up as a result of the spring-like reaction of the fender units and such movement can lead to parting of the mooring ropes.

To overcome these problems the illustrated unit incorporates two piston and cylinder or ram units 30 for checking the rates of inward and outward movement of the wheel following an impact. As shown, the cylinders of the ram units 30 are disposed in a recess in the wall behind the inner side of the casing and are pivotally secured with respect to the inner vertical plate 18 of the casing by a trunnion ring 31 mounted at the forward or outer end of the cylinder, the trunnion pins being mounted in bearing blocks 32 secured to but spaced behind the plate 18. The piston rod 34 of each of the ram units is connected through an adjustable yoke member 35, a pin 36 and an extension rod 37 to one of the two bearing blocks 21.

The two ram units are enclosed by a protective casing 38 on one wall of which are mounted two reservoir tanks 39 which are open to atmosphere and which are respectively associated with the two ram units 30. As shown diagrammatically in FIG. 3 the forward and rearward ends of the cylinder 40 of each ram unit are in communication with each other through a line 41 incorporating a fluid flow control means 42, and through a parallel line 43 incorporating a fluid flow control means 44.

Fluid flow control means 42 is shown in more detail in FIG. 4, and comprises a body part 46 in which are formed a chamber, an inlet passage 48 leading to the chamber, and an outlet passage 49 leading from the chamber. A seating for a ball member 50 disposed in the chamber is formed where the passage 48 opens to the chamber, and a spring 51 urges the ball member on to its seating. Spring 51 is carried by a platform 52 slidably mounted in the chamber and connected to one end of a rod 53 slidably mounted in the body part. The other end of rod 53 is pivotally attached by a link 54 to a lever 55 which is pivotally mounted on a fixed part 56 of the structure and which has at its other end a lengthwise extending slot 57 engaged by a pin 58 on the yoke member 35.

Fluid flow control means 44 comprises a non-return valve 60 and an adjustable restrictor 61 downstream of valve 60. Balancing flow lines 62, 63 are provided between the hydraulic circuits of the two ram units.

The load on the hull of the ship increases progressively as the tire deflects inward against the rollers to deform the tire and further compress the contained gas. The load (which is the resistance to movement of the ship) increases in strict dependence upon the internal pressure of the tire, where there is no resistance to the inward movement of the axle other than the fixed rollers. In consequence, in previous arrangements where the only resistance to movement of the wheel is provided by the rollers, a substantial movement of the axle takes place under low load conditions and the energy absorbed during such movement is relatively small.

When the wheel 11 is struck by a ship, the pistons of the ram units are at the right hand ends of their movement, referring to FIG. 3, and by virtue of the levers 55, the platforms 52 are in their positions closest to the ball members 50 and cause the springs 51 to apply a high loading tending to hold the ball members in their closed position. In consequence the initial movement of the wheel is strongly resisted so that a high load condition of the tire is reached near the beginning of the axle movement with a consequent increase in the energy absorbed. The load is however not allowed to exceed the maximum permissible pressure on the hull. As the pistons move leftward on the in-stroke, the loading of the springs 51 is progressively reduced by the levers 55, thus decreasing the effective resistance of the ball members 50 and the decrease is arranged to match the increasing resistance to movement afforded by the fixed rollers and thus maintains the load at a value not inconsistent with the maximum permissible pressure on the hull. Holes extend through the spring platform 52 to equalize the fluid pressure acting on it.

During the in-stroke the non-return valve 60 prevents flow through the line 43. During the out-stroke, the ball member 50 is held on its seat by the fluid pressure and spring 51, but the pressure opens valve 60 so that fluid flows through the restrictor 61 to the outward end of the ram cylinder, the restrictor serving to damp the flow.

By damping the rebound movement of the wheel, the risk of causing a ship to be pushed away rapidly is very much reduced, and thus is an important consideration in some installations, for example at a lock entrance where the ship may be pushed violently into collission with the other side of the lock entrance with resultant damage to the ship and lock.

In a modified arrangement, illustrated in FIG. 5, each of the fluid flow control means 42 incorporates a spool valve comprising a valve body 66 and a spool 67 having two spaced lands 68, 69 and an actuating rod 70 connected to the spool. The cylinder space between the spools has an inlet port 71 and an outlet port 72 opening to it and the land 68 progressively increases the effective area of the outlet port, and hence reduces the damping effect on the ram unit, as the spool is moved leftward with the ram piston. A spring-loaded non-return valve 73 arranged in series with the spool valve permits flow through the line 41 only during the in-stroke of the ram. A passage extends axially through the spool to equalize the pressures at the ends of the valve cylinder.

In another alternative construction of the fluid flow control means as shown in FIG. 6 the link 54 is connected to a valve member 75 having a generally conical portion 76 co-operating with a valve orifice interconnecting inlet and outlet passages 78, 79 to adjust the restriction afforded by the orifice. The profile of the portion 76 can be shaped to produce the required rate of reduction of the restriction as the ram piston moves on its in-stroke. Again a non-return valve 73 is arranged in series with the control valve.

If desired, a single lever 55 may be provided and arranged to control the fluid flow control means 42 of both ram units.

The valve shown in FIG. 4 is advantageous in that if the wheel is struck exceptionally heavily by a ship, the ball members 50 of the valves can act as relief valves to prevent excessive fluid pressures in the system. The valves shown in FIGS. 5 and 6 do not have this attribute but the disadvantage can be overcome in each case by placing a spring-loaded relief valve in parallel with the spool valve 67, 72 or valve 76, the spring loading being set at an appropriately high value so as not to interfere with the operation of the fluid flow control valve 67, 72 or 76, under normal operating conditions.

We claim:

1. A fender unit comprising a supporting structure, a wheel mounting, a wheel having a pneumatic tire and means mounting said wheel for rotation about a vertical axis in said wheel mounting, said supporting structure having guide means for guiding the movement of said wheel mounting for guided movement in a rectilinear path perpendicular to said axis inwardly from and outwardly towards an outer limiting position, at least one roller and means mounting said roller in the supporting structure for rotation about a fixed vertical axis, said roller being in engagement with the pneumatic tyre of the wheel resiliently to resist inward movement of the wheel along said path, and hydraulic control means operative to apply high resistance to initial inward movement of the wheel along said path and to reduce said resistance as inward displacement of the wheel from its outer limiting position increases.

2. A fender unit as claimed in claim 1, wherein said tire provides the entire resilient resistance to inward movement of the wheel.

3. A fender unit as claimed in claim 1, wherein the hydraulic control means includes means for reducing the rate of outward re-bound movement of the wheel towards its outer limiting position.

4. A fender unit as claimed in claim 3, wherein the hydraulic control means includes a hydraulic ram comprising a ram cylinder and a ram piston connected between the wheel axis and the supporting structure, a flow passage interconnecting opposite ends of the ram cylinder, and wherein said means for reducing the rate of outward re-bound movement comprises an adjustable restrictor disposed in said flow passage.

5. A fender unit as claimed in claim 1, wherein the hydraulic control means includes a hydraulic ram comprising a ram cylinder and a ram piston connected between the wheel axis and the supporting structure, a flow passage interconnecting opposite ends of the ram cylinder, a fluid flow passage interconnecting opposite ends of the ram cylinder, and a flow control valve disposed in said flow passage and comprising a ball valve member, a seating for the valve member, a spring urging the ball valve member on to its seat, a spring platform supporting the spring and means for varying the position of the platform in dependence on the position of the ram piston lengthwise of the cylinder for reducing the spring pressure as the piston moves inward from said outer limiting position.

6. A fender unit as claimed in claim 5, further comprising a lever having a first end pivotally connected to the supporting structure and a second end connected to move with the wheel, said lever being linked to said spring platform thereby to move the platform in dependence on the position of the ram piston lengthwise of the ram cylinder.

7. A fender unit as claimed in claim 1, wherein the hydraulic control means comprises a spool valve comprising a valve cylinder having an inlet port and an outlet port spaced from each other lengthwise of the cylinder and a valve spool mounted for sliding movement in the cylinder to increase the effective area of the outlet port as inward displacement of the wheel from its outer limiting position increases.

8. A fender unit as claimed in claim 7, further comprising a lever having a first end pivotally connected to the supporting structure and a second end connected to move with the wheel, said lever being linked to said valve spool to move the spool in dependence on the position of the ram piston lengthwise of the ram cylinder.

9. A fender unit as claimed in claim 1, wherein the hydraulic control means comprises a valve member having a generally conical portion cooperating with a valve orifice, said valve member operating to increase the effective area of the valve orifice as inward displacement of the wheel from its outer limiting position increases.

10. A fender unit as claimed in claim 9, further comprising a lever having a first end pivotally connected to the supporting structure and a second end connected to move with the wheel, said lever being linked to said valve member to move the valve member in dependence on the position of the ram piston lengthwise of the ram cylinder.

* * * * *